(12) United States Patent
Smollock et al.

(10) Patent No.: US 7,178,615 B1
(45) Date of Patent: Feb. 20, 2007

(54) TRANSPORT SYSTEM FOR PORTABLE AUGER

(75) Inventors: Michael J. Smollock, Gloucester, NJ (US); Stephen A. Matson, Phoenixville, PA (US); Stephen D. Rich, Boyertown, PA (US)

(73) Assignee: Mackissic, Inc., Parker Ford, PA (US)

( * ) Notice: Subject to any disclaimer, the term of this patent is extended or adjusted under 35 U.S.C. 154(b) by 74 days.

(21) Appl. No.: 10/763,797

(22) Filed: Jan. 23, 2004

Related U.S. Application Data

(60) Provisional application No. 60/442,252, filed on Jan. 24, 2003.

(51) Int. Cl.
*B62D 51/04* (2006.01)
(52) U.S. Cl. .................... 180/19.1; 180/297
(58) Field of Classification Search .......... 180/11, 180/15, 16, 19.1, 14.1, 14.2, 297, 65.1
See application file for complete search history.

(56) References Cited

U.S. PATENT DOCUMENTS

| | | | | |
|---|---|---|---|---|
| 3,864,858 A | * | 2/1975 | Rochfort | 404/98 |
| 4,483,084 A | * | 11/1984 | Caldwell et al. | 37/349 |
| 5,163,527 A | * | 11/1992 | Eveleth | 180/19.1 |
| 6,745,859 B2 | * | 6/2004 | Simons et al. | 180/19.1 |

* cited by examiner

*Primary Examiner*—Anne Marie Boehler
(74) *Attorney, Agent, or Firm*—Fox Rothschild LLP; John P. Blasko

(57) ABSTRACT

A transport system is provided for a portable auger. The transport system comprises a dedicated powered drive unit to provide powered-assisted, wheel movement of the auger by an individual. Means are provided for allowing the wheel, or wheels, driven by the dedicated power drive unit to freewheel when the dedicated power drive unit is not in use. Optionally, when the dedicated power drive unit is not in use, separate means may also be provided for locking the output shaft of the dedicated powered drive unit.

13 Claims, 10 Drawing Sheets

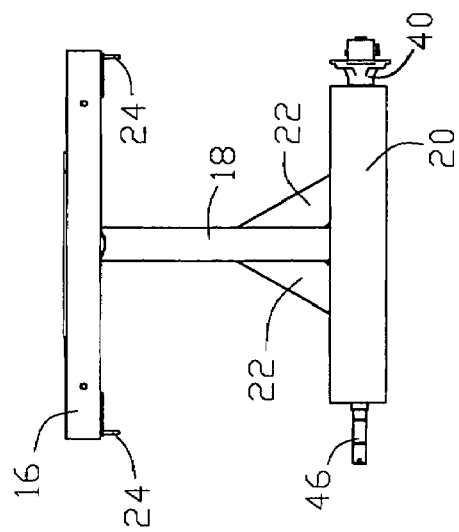
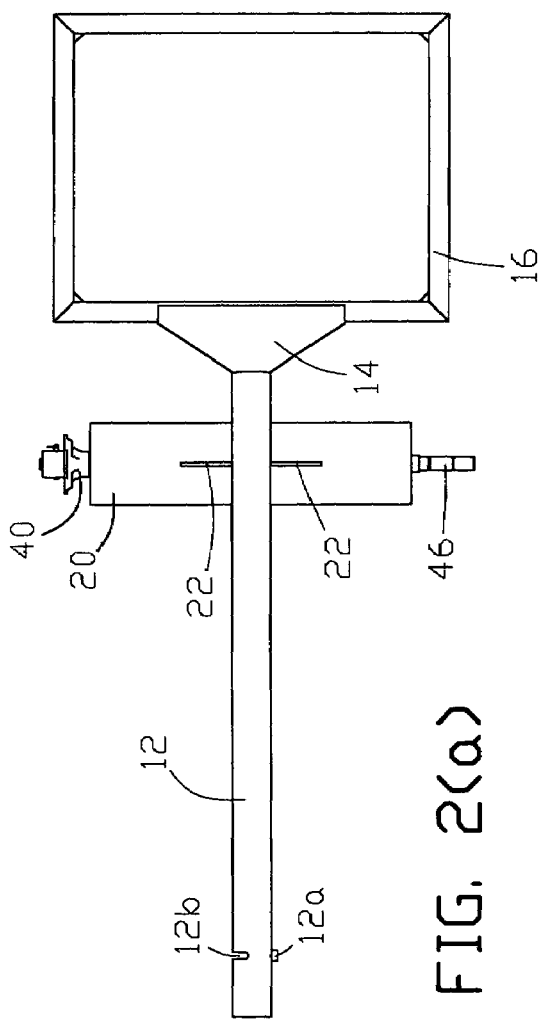
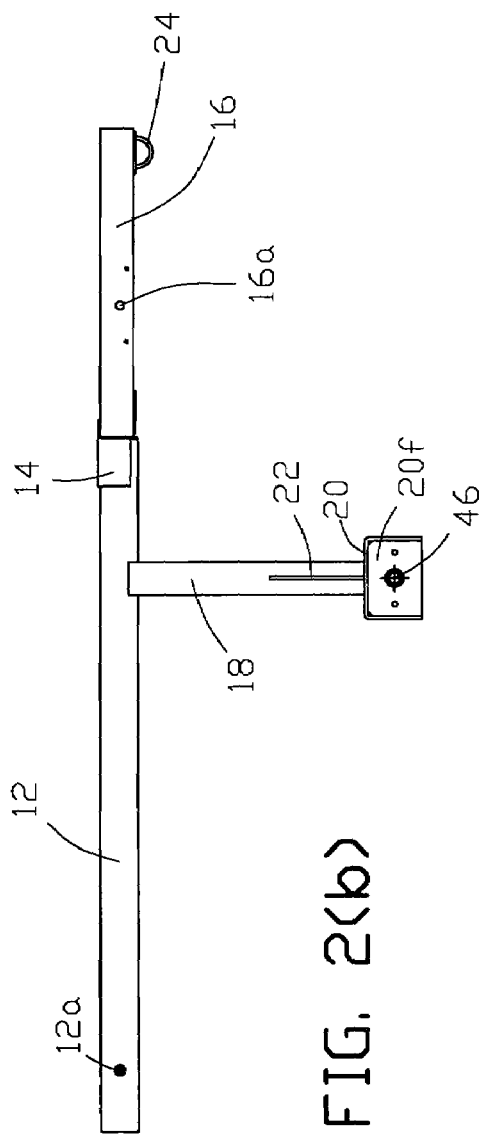

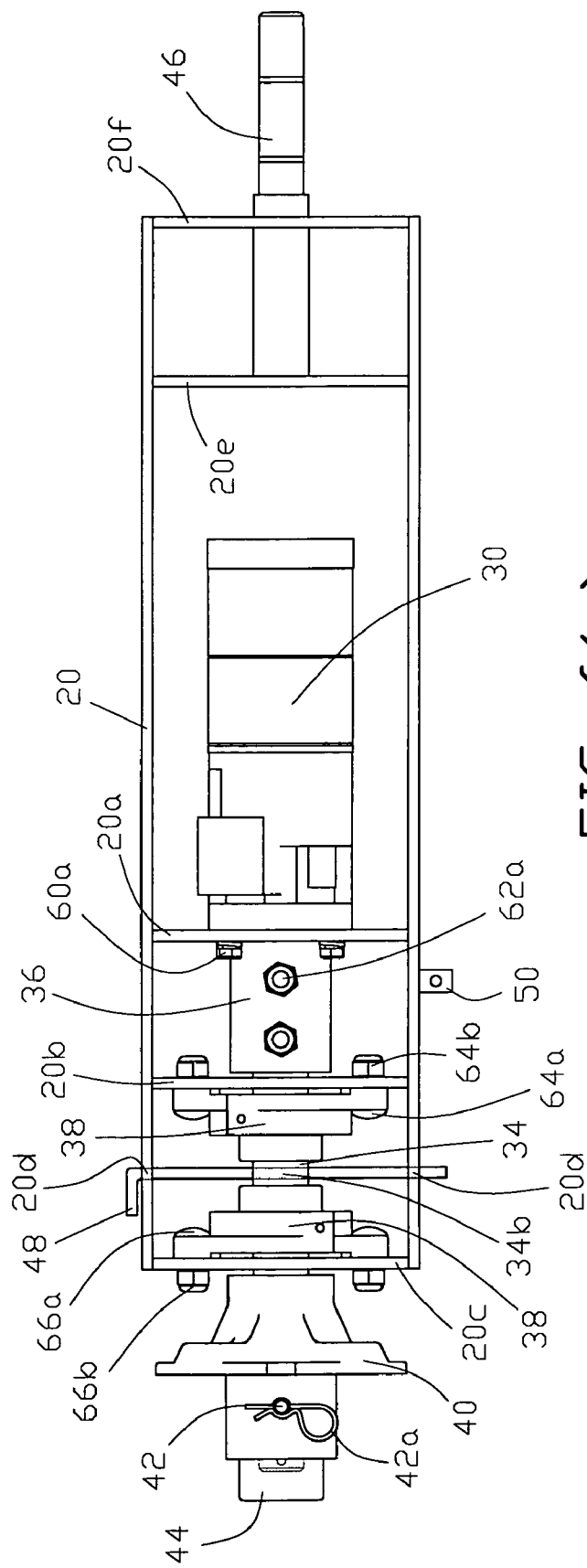

US 7,178,615 B1

TRANSPORT SYSTEM FOR PORTABLE AUGER

CROSS REFERENCE TO RELATED APPLICATIONS

This application claims the benefit of U.S. Provisional Application No. 60/442,252, filed Jan. 24, 2003, hereby incorporated herein by reference.

FIELD OF THE INVENTION

The present invention relates to transport systems for portable augers.

BACKGROUND OF THE INVENTION

Portable augers are used for earth boring activities, such as digging holes for fence posts. The portable auger may be transported by one or more individuals wheeling it from site to site, either by manpower alone, or with assistance from a powered drive. The portable auger may also be moved or towed by a machine, such as a truck, from site to site. If a powered drive is used, the powered drive unit must be disengaged from each wheel that it is driving to avoid damage to the drive unit when moving the auger with another machine. One object of the present invention is to provide a transport system for a portable auger that has a dedicated powered drive unit for wheeled, power-assist by an individual. Another objective of the present invention is to provide an uncomplicated means for allowing the power-driven wheels to freewheel when the portable auger is moved by another machine. Another object of the present invention is to provide separate optional means for locking the output of the powered drive unit.

BRIEF SUMMARY OF THE INVENTION

In one aspect, the present invention is an apparatus for and method of providing a transport system for a portable auger wherein a dedicated powered drive unit is provided for power-assisted, wheeled movement of the portable auger by an operator. Means are provided to allow a wheel connected to the output of the dedicated powered drive unit to freewheel when the portable auger is moved or towed by another machine. Optionally, separate means may be provided for locking the output of the dedicated powered drive unit when the portable auger is moved or towed by another machine.

Other aspects of the invention are set forth in this specification

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 2(a) is a top view of the structural frame illustrated in FIG. 1.

FIG. 2(b) is a side view of the structural frame illustrated in FIG. 1.

FIG. 2(c) is a front view of the structural frame illustrated in FIG. 1.

FIG. 6(a) and FIG. 6(b) are another example of a transport system of the present invention.

DETAILED DESCRIPTION OF THE INVENTION

Figure 1:
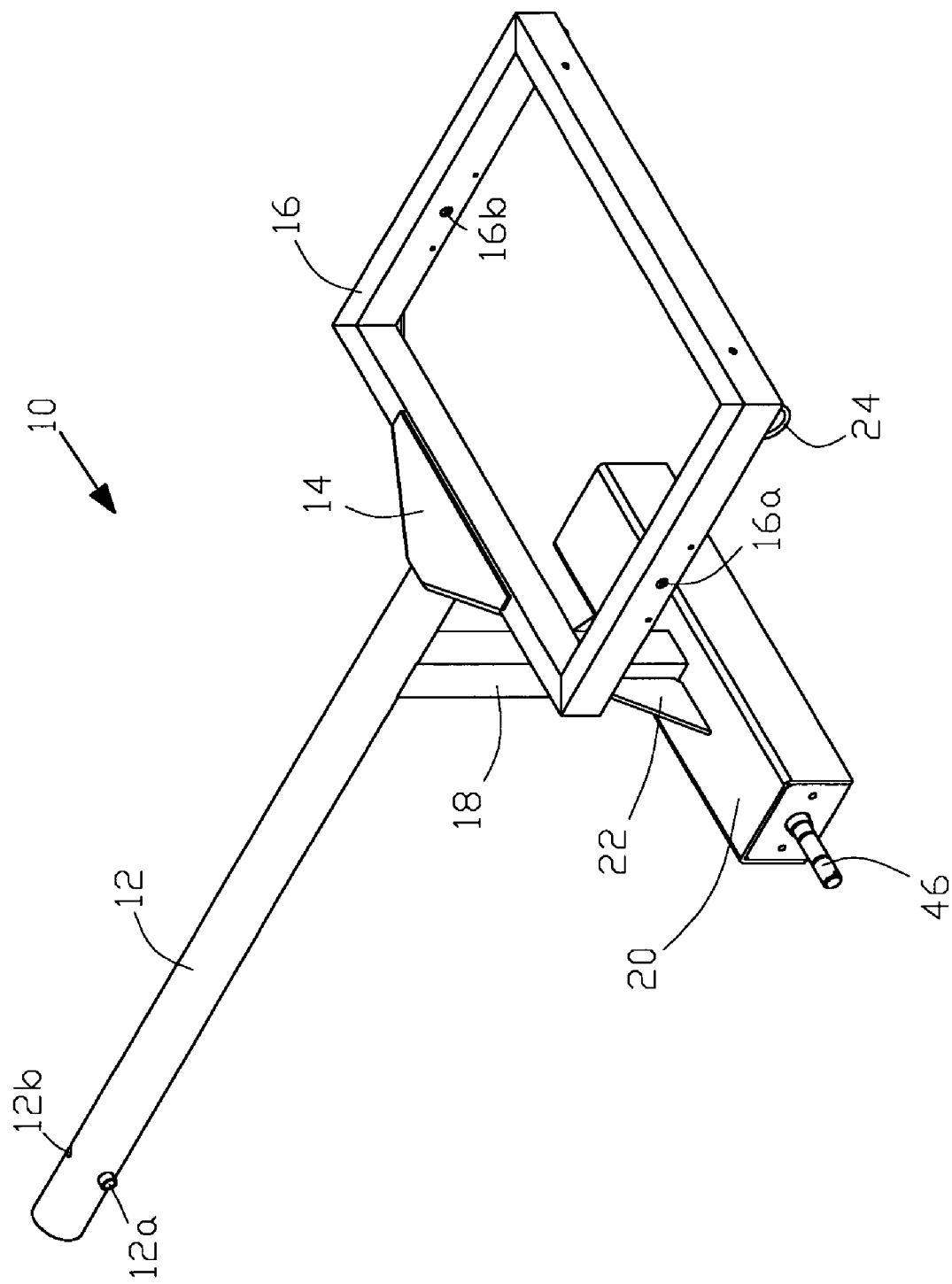
FIG. 1 is an isometric view of one example of a structural frame used with the transport system of the present invention.
Figure 3A:
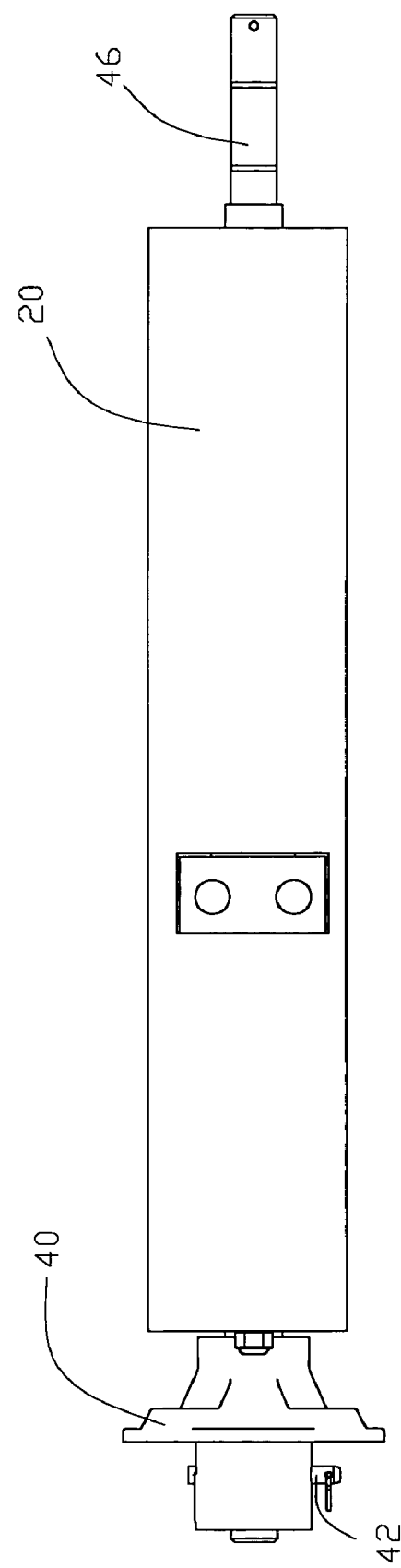
FIG. 3(a) is a rear/operator position view of one example of an axle housing, with associated components, that is used with the transport system of the present invention.
Figure 3B:
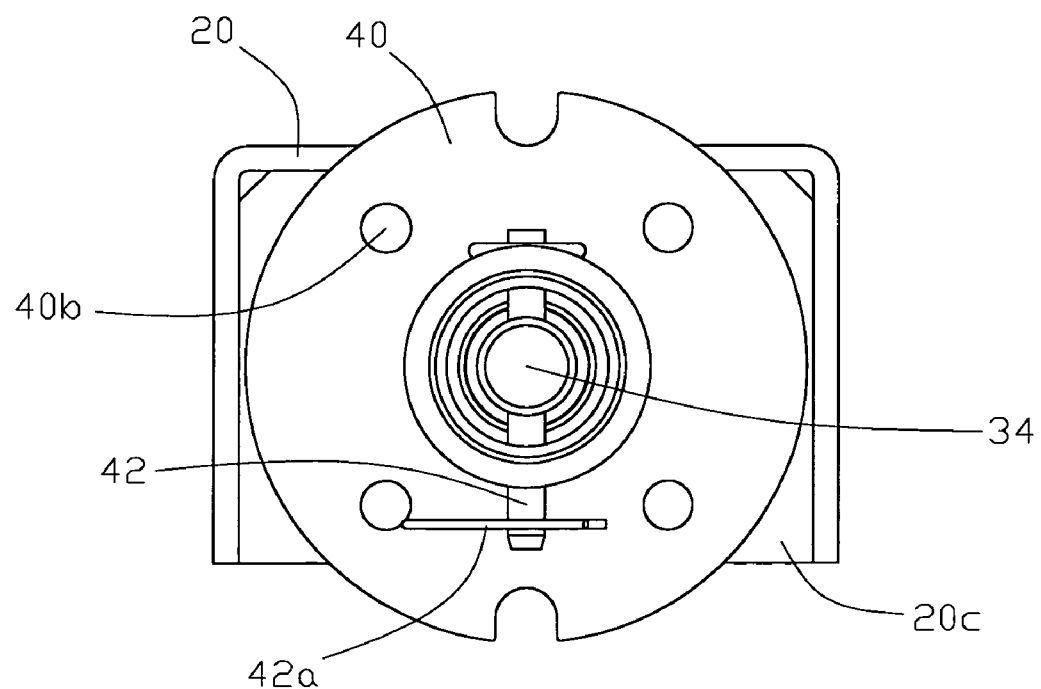
FIG. 3(b) is a right side view of the axle housing illustrated in FIG. 3(a).
Figure 3C:
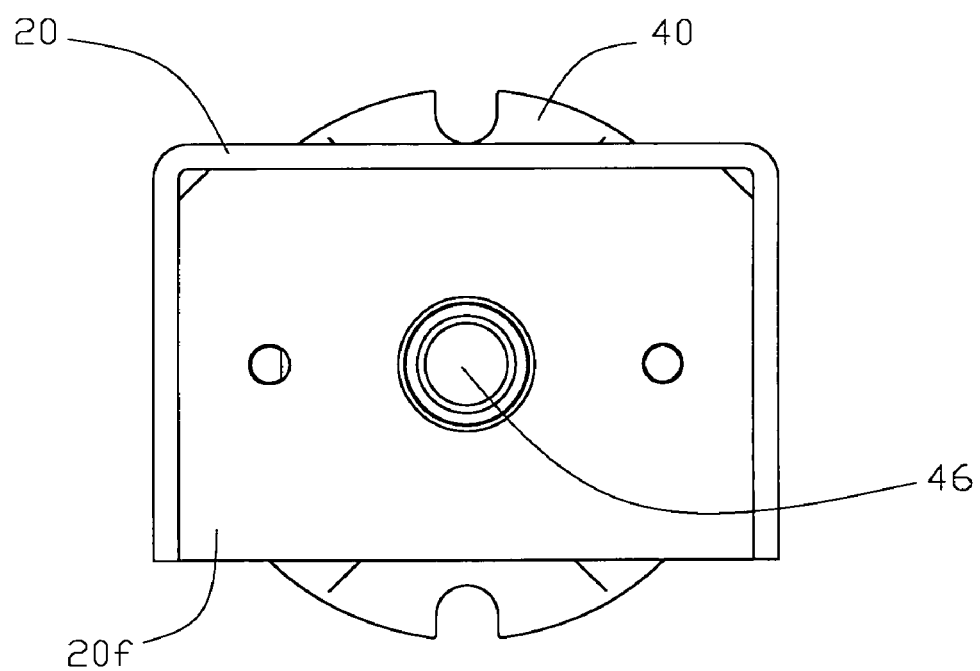
FIG. 3(c) is a left side view of the axle housing illustrated in FIG. 3(a).

Referring now to the drawings, wherein like numerals indicate like elements, there is shown in the figures one example of the transport system for a portable auger of the present invention. In FIG. 1, and FIG. 2(a) through FIG. 2(c), transport system 10 is shown without auger, power source and wheels attached. Lever tube 12 is suitably attached (e.g. by weld) to frame brace 14 and power source frame 16. Frame bracket 14 is suitably attached to power source frame 16. In this non-limiting example of the invention optional frame brace 14 provides a rigid connection between lever tube 12 and power source frame 16. A power source is suitably attached to frame 16. For example the power source may be pivotally connected to frame 16 via openings 16a and 16b so that the base of the power source will maintain a horizontal orientation when the portable auger is pivoted about its axles to which wheels are attached as further described below. Center pivot tube 18 is suitably connected at one end to lever tube 12 and at the opposing end to axle housing 20. Pivot tube gussets 22, suitably attached to center pivot tube 18 and the top of axle housing 20 may be provided for additional strength at the center pivot tube and axle housing point of connection. The auger may be pivotally attached to the lever tube 12 by insertion of a handle into the lever tube. For example, raised hole 12a and opening 12b can be used to provide a quick connect/disconnect means for locking the inserted handle in place. The auger can be pivotally attached to the handle. A wheel is attached to an axle protruding from each end of the axle housing as further described below.

Figure 7:
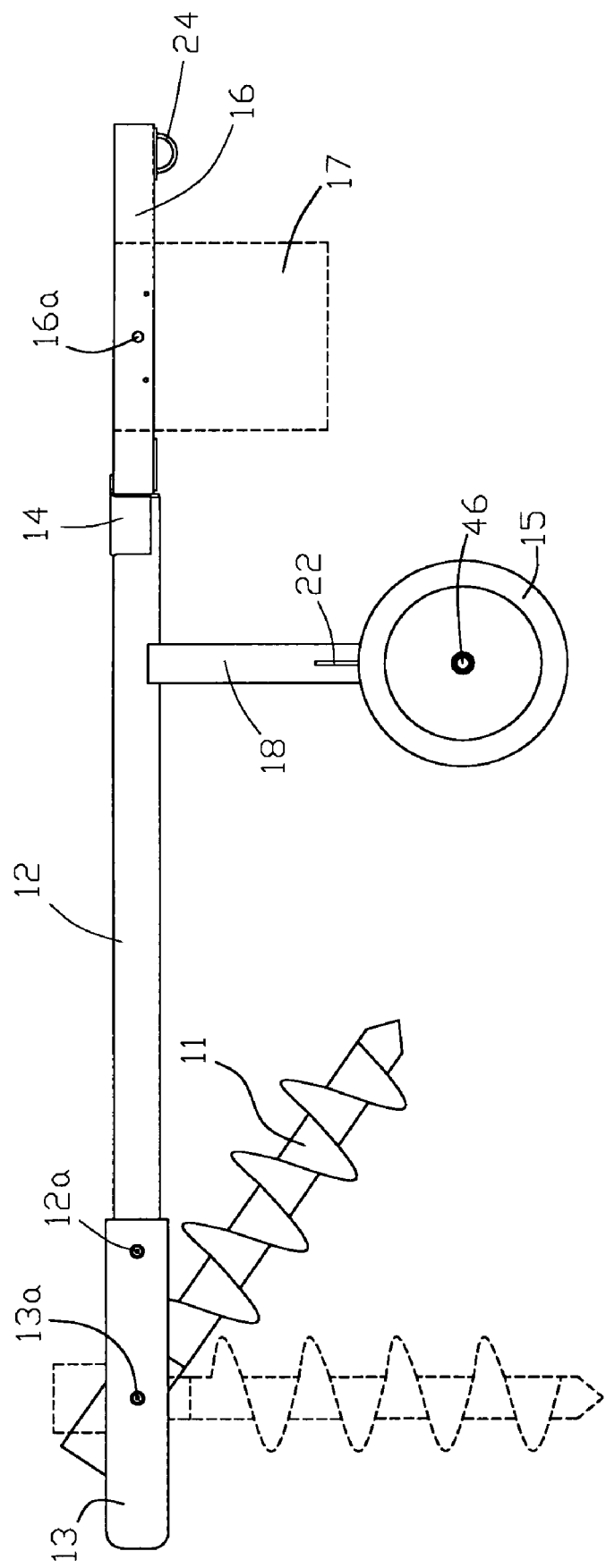
FIG. 7 is a side view of the structural frame illustrated in FIG. 2(b) with a typical auger and power source associated with the transport system.

FIG. 7 illustrates a power source 17 (dashed outline of power source) pivotally mounted within frame 16 and about openings 16a and 16b by suitable fasteners. Also typically illustrated in FIG. 7 is auger 11 rotatably mounted about openings 13a in handle 13. The auger is shown in solid lines in a typical stowed position during transport of the portable auger and in dashed lines when in use to bore a hole. Wheel 15 is shown attached to freewheeling axle 46; a second wheel is attached to drive hub 40 as further described below.

One or more chain brackets 24 are suitably attached to the front end of power source frame 16. In other examples of the invention, a tow bar is attached to the front end of the power source frame. When towed by another machine, such as a truck, a connecting means, such as a chain, can be attached between the truck and chain brackets 24 or tow bar. In tow mode, the portable auger is generally oriented in the horizontal position shown in FIG. 2(b). An individual can move the portable auger by sufficiently lowering the end of lever tube 12 to which the auger is attached so that the power source is raised off of the ground. Lowering the end of the lever tube to which the auger is attached pivots the transport system about the axles to which the wheels are attached. Transport drive controls can be mounted near the auger end of the lever tube so that the operator can activate and deactivate the transport powered drive unit that is mounted in axle housing 20 as further described below. The auger when not in use, for example, during tow or movement by an individual, is generally stowed adjacent to the lever tube by pivoting the auger about its connection point to the lever tube or to the handle connected to the lever tube. For use of the auger, the end of the center pivot tube to which the auger is attached is allowed to raise up until the power source (serving as a counterweight) rests on the ground, and the auger is pivoted down from its stowed position to a generally vertical orientation with respect to the auger's axial length. Auger drive controls can be mounted near the end of the lever tube to which the auger is attached so that the operator can activate and deactivate the auger drive that can be mounted to the top of the axial length of the auger.

The utilized power system may be any power system that can be self-contained on the transport frame, such as an electrical or hydraulic system. In the preferred example of the invention, the power system is hydraulic. For the preferred embodiment, the power source is a hydraulic power source providing pressurized hydraulic fluid in suitable hoses to the separate transport powered drive unit and auger powered drive unit via the transport drive controls and auger drive controls, respectively.

Figure 4:
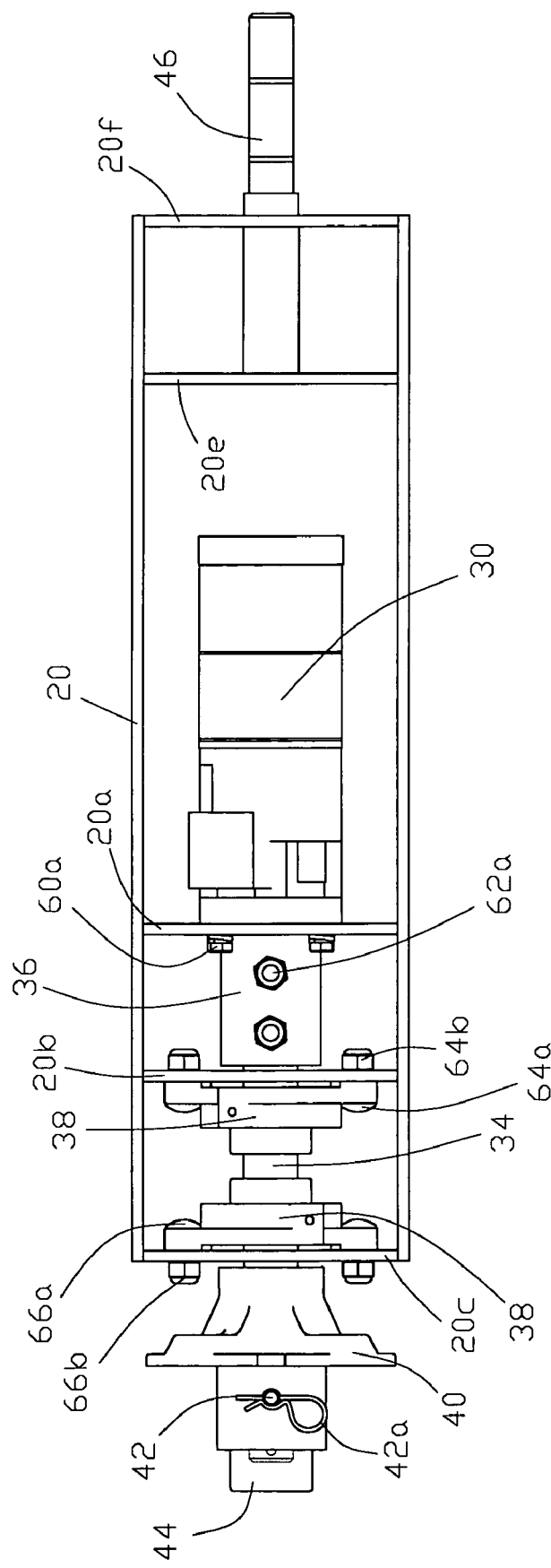
FIG. 4 is a bottom view of the axle housing illustrated in FIG. 3(a).
Figure 5A:
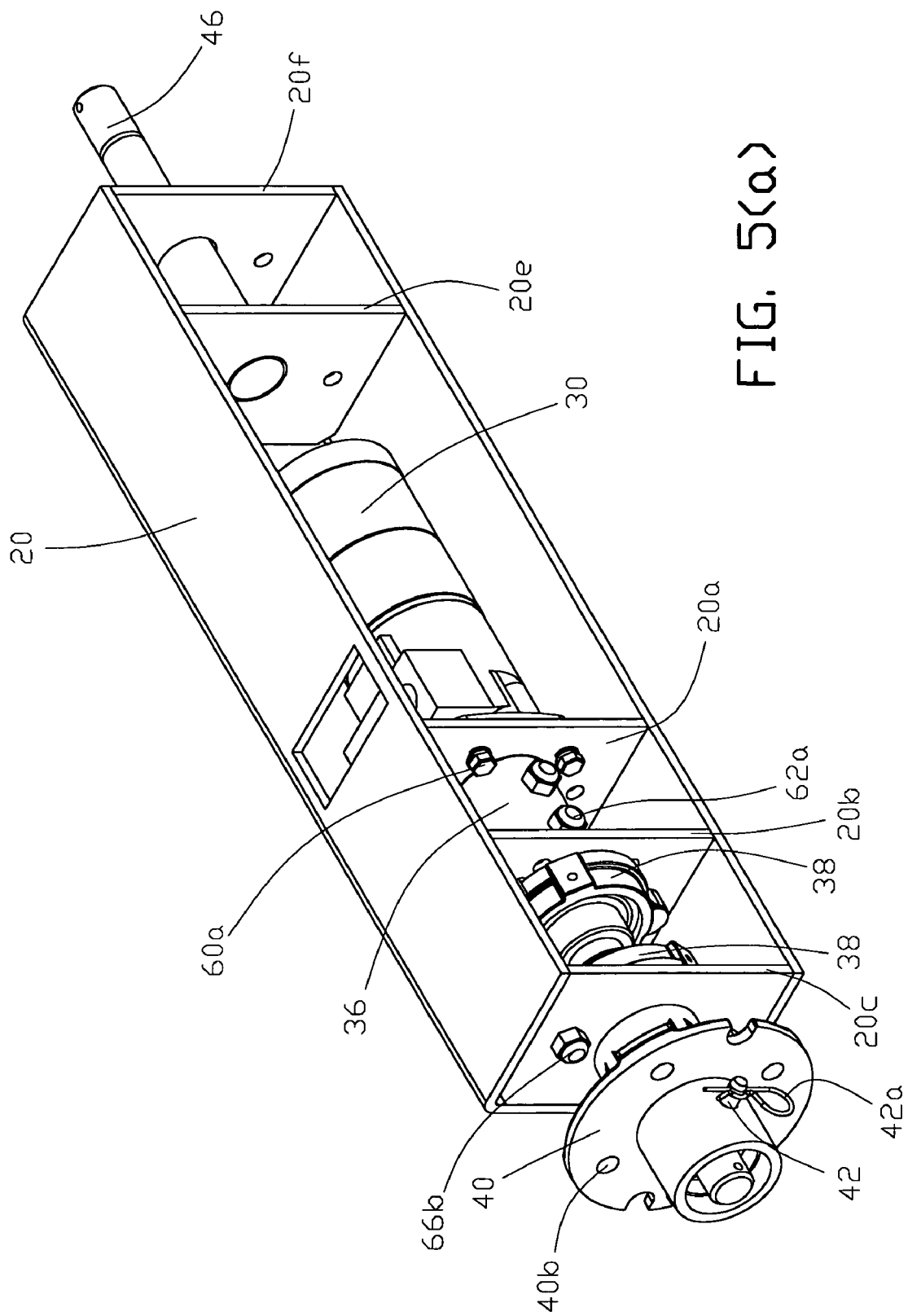
FIG. 5(a) is a bottom isometric view of the axle housing illustrated in FIG. 3(a).
Figure 5B:
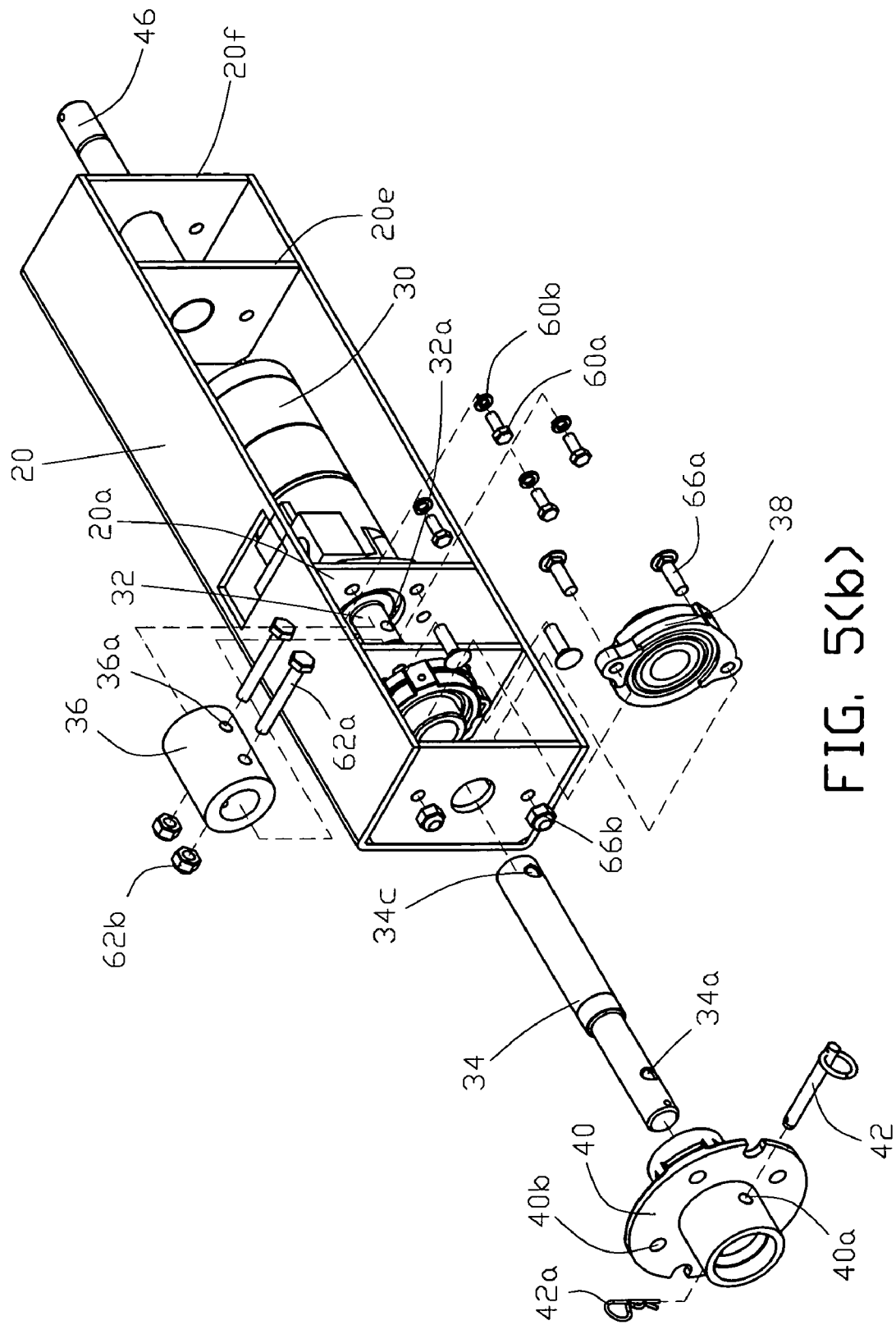
FIG. 5(b) is an exploded bottom isometric view of the axle housing illustrated in FIG. 3(a).

In this non-limiting example of the invention, axle housing 20 has a number of housing plates suitably attached to it (e.g., by welding) for mounting associated components as described below. Transport powered drive unit 30 is suitably mounted to the axle housing. For example, as shown in the figures, transport powered drive unit 30 is attached to axle housing plate 20a by screws and lockwashers 60a and 60b, respectively. Output shaft 32 of the transport powered drive unit is rigidly connected to powered wheel axle 34 by suitable means. For example, as shown in the figures, connecting sleeve 36 slips over mating ends of output shaft 32 and axle 34. Screws 62a pass through holes 36a, 32a and 34c, in the connecting sleeve, output shaft and axle, respectively and mate with nuts 62b to hold the output shaft and axle rigidly together. One alternative means of fastening the connecting sleeve to the output shaft and axle are to provide threaded recesses in the output shaft and axle into which suitable fasteners are inserted. In this non-limiting example of the invention a pair of flange bearing assemblies 38 are used to support drive wheel axle 34. The inner bearing assembly is attached to axle housing plate 20b by screws and nuts 64a and 64b, respectively. Outer bearing assembly is attached to axle housing plate 20c by screws and nuts 66a and 66b, respectively. Plate 20c also serves as an end plate of the axle housing in this example of the invention. Drive hub 40 is suitably inserted on, or attached to, the end of drive wheel axle 34 so that it will freewheel around the axle if hub locking pin 42 is not inserted through holes 40a in the drive hub and hole 34a in the drive wheel axle. One means of attaching drive hub 40 to the end of drive wheel axle 34 is by use of a nut 44 threaded onto drive wheel axle 34, as shown in FIG. 4. The nut must be screwed on to the end of the drive wheel axle. A wheel (not shown) is secured to drive hub 40 via inserting suitable fasteners through holes 40b, which are radially disposed around an inner circumference of the drive hub. In this example of the invention, the wheel at the opposite end of the axle housing is not power driven and is always freewheeling. This wheel is suitably attached to free wheeling axle 46. When the wheel connected to drive hub 40 is not power driven by transport power drive unit 30, hub locking pin 42 must be removed from hub 40 and drive wheel axle 34.

Figure 6B:
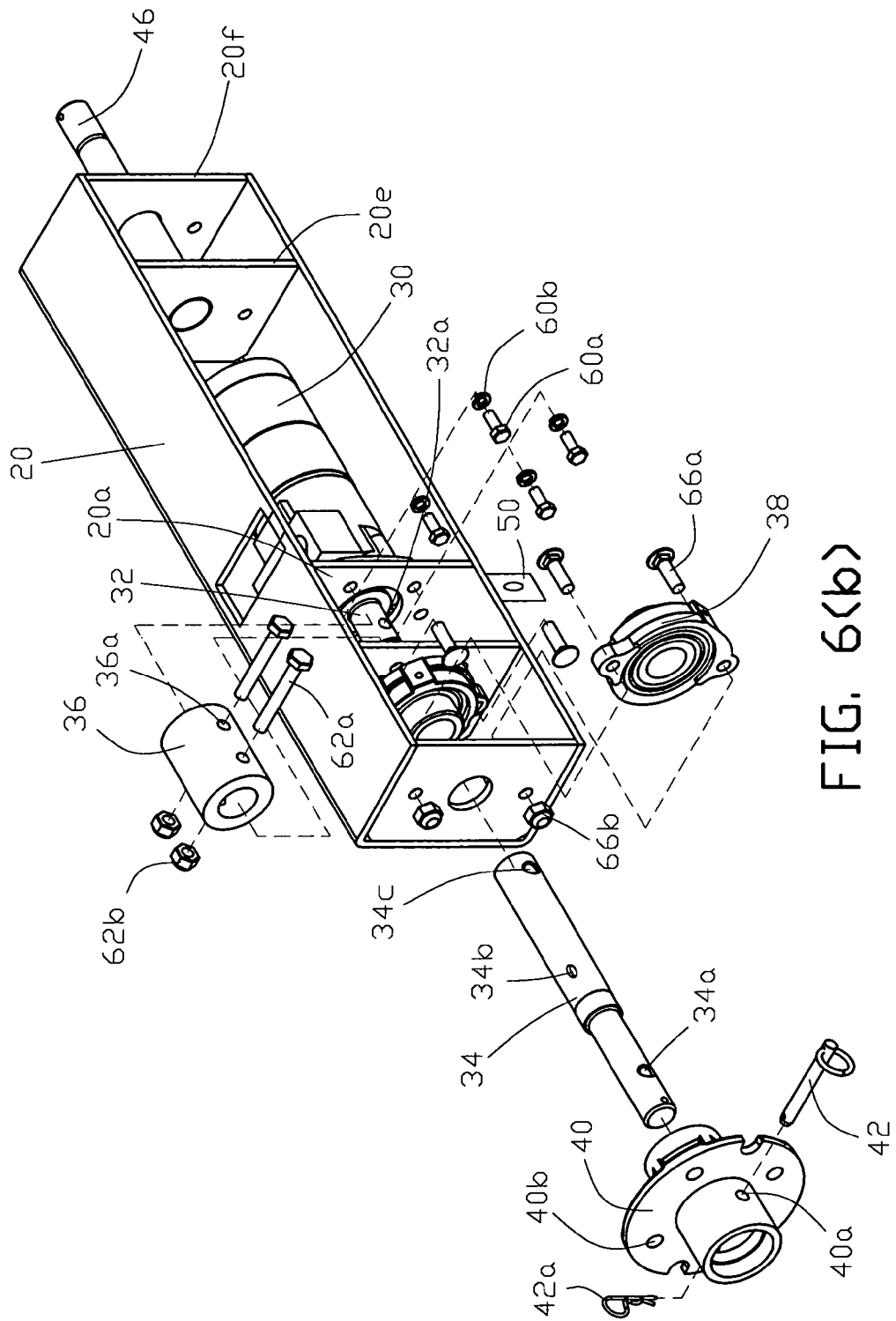

In another example of the invention, in addition to the drive hub locking and unlocking means, separate means may be provided for securely locking the output of the transport powered drive unit. As illustrated in FIG. 6(a) and FIG. 6(b), drive axle pin 48 is inserted through openings 20d in axle housing 20 and opening 34b in drive wheel axle 34 to lock the drive wheel axle, and the output shaft 32 of transport powered drive unit 30 to which it is attached. In alternative examples of the invention, rather than locking through a hole in the drive wheel axle, a hole may be provided in the output shaft for direct locking of the output shaft.

In operation of this non-limiting example of the invention, when transport system 10 is being wheeled by an individual with powered assist from the transport powered drive unit, hub locking pin 42 is inserted through openings 40a in drive hub 40 and opening 34a in drive wheel axle 34. The hub locking pin may be secured in this position by using a suitable fastener, such as cotter pin 42a.

If the optional means for locking the output of the transport powered drive unit is provided, in this non-limiting example of the invention, when the transport powered drive unit is being used, drive axle pin 48 is not inserted through openings 20d in axle housing 20 and opening 34b in drive wheel axle 34, and the drive axle pin may be attached by a chain, or similar fastener, to the axle housing and stowed in a hole in a tow bar, if used, or in optional pin holder 50.

In operation of this non-limiting example of the invention, when the transport powered drive unit is not being used, hub locking pin 42 is not inserted through openings 40a in drive hub 40 and opening 34a in drive wheel axle 34. Hub locking pin 42, and its fastener, if used, may be attached by a chain, or other suitable fastener, to the axle housing, and stowed in a hole in a tow bar, if used, or in an optional pin holder on the structural frame of the transport system.

If the optional means for locking the output of the transport powered drive unit is provided, when the transport powered drive unit is not being used, drive axle pin 48 is inserted through openings 20d in axle housing 20 and opening 34b in drive wheel axle 34.

In the present example of the invention, only one of the two wheels used in the transport system is power driven by the transport powered drive unit. In alternative examples of the invention, both wheels may be power driven, and a drive axle pin and hub locking pin can be provided for each of the two power driven wheels.

The foregoing examples do not limit the scope of the disclosed invention. The scope of the disclosed invention is further set forth in the appended claims.

The invention claimed is:

1. A transport system for a portable auger comprising:
   a lever tube having a first lever tube end and a second lever tube end;
   a power source frame for mounting of an auger power source, the first lever tube end rigidly connected to the power source frame,
   a pivot tube having a first pivot tube end and a second pivot tune end, the first pivot tube end rigidly connected to the first lever tube end;

an axle housing, having a first axle housing end and a second axle housing end, the second pivot tube end rigidly connected to the axle housing;

a transport powered drive unit having a power output shaft, the transport powered drive unit mounted internal to the axle housing;

a powered wheel axle having a first powered wheel axle end and a second powered wheel axle end, the first powered wheel axle end suitably connected to the power output shaft, the second powered wheel axle end protruding from the first axle housing end;

a drive hub inserted on the second powered wheel axle end, the drive hub suitably attached to the second powered wheel axle end to freewheel about the powered wheel axle, the drive hub having a means for attachment of a first wheel;

a means for selectively locking the drive hub to the powered wheel axle to prevent the drive hub from freewheeling about the powered wheel axle; and a freewheeling axle having a first freewheeling axle end and a second freewheeling axle end, the first freewheeling axle end suitably connected to the second axle housing end, the second freewheeling housing end having means for attachment of a second wheel.

2. The transport system of claim 1 wherein the means for selectively locking the drive hub to the powered wheel axle comprises an opening in the powered wheel axle; and opening in the drive hub; and a hub locking pin, whereby insertion of the hub locking pin in the openings in the powered wheel axle and the drive hub locks the drive hub to the powered wheel axle.

3. The transport system of claim 2 further comprising a means for locking the power output shaft to prevent rotation of the power output shaft.

4. The transport system of claim 3 wherein the means for locking the power output shaft comprises an opening in the powered wheel axle; an opening in the axle housing and a drive axle pin, whereby insertion of the drive axle pin in the openings in the axle housing and the powered wheel axle locks the power output shaft.

5. The transport system of claim 3 wherein the means for locking the power output shaft comprises an opening in the power output shaft; an opening in the axle housing and a drive axle pin, whereby insertion of the drive axle pin in the openings in the axle housing and the power output shaft locks the power output shaft.

6. The transport system of claim 1 wherein the power source is pivotably mounted to the power source frame, whereby the power source maintains a horizontal orientation when the transport system is pivoted about the powered wheel axle and the free wheel axle.

7. The transport system of claim 1 wherein the first powered wheel axle end is suitably connected to the power output shaft by a connecting sleeve, the connecting sleeve suitably fastened to the first powered wheel axle end and the power output shaft.

8. An axle assembly for a transport system for a portable auger, the axle assembly comprising:

an axle housing, having a first axle housing end and a second axle housing end;

a transport powered drive unit having a power output shaft, the transport powered drive unit mounted internal to the axle housing;

a powered wheel axle having a first powered wheel axle end and a second powered wheel axle end, the first powered wheel axle end suitably connected to the power output shaft, the second powered wheel axle end protruding from the first axle housing end;

a drive hub inserted on the second powered wheel axle end, the drive hub suitably attached to the second powered wheel axle end to freewheel about the powered wheel axle, the drive hub having a means for attachment of a first wheel;

a means for selectively locking the drive hub to the powered wheel axle to prevent the drive hub from freewheeling about the powered wheel axle;

a freewheeling axle having a first freewheeling axle end and a second freewheeling axle end, the first freewheeling axle end suitably connected to the second axle housing end, the second freewheeling housing end having means for attachment of a second wheel, and a lock for locking the power output shaft to prevent rotation of the power output shaft comprising an opening in the powered wheel axle; an opening in the axle housing and a drive axle pin, whereby insertion of the drive axle pin in the openings in the axle housing and the powered wheel axle locks the power output shaft.

9. The axle assembly of claim 8 wherein the means for selectively locking the drive hub to the powered wheel axle comprises an opening in the powered wheel axle; and opening in the drive hub; and a hub locking pin, whereby insertion of the hub locking pin in the openings in the powered wheel axle and the drive hub locks the drive hub to the powered wheel axle.

10. The axle assembly of claim 8 wherein the first powered wheel axle end is suitably connected to power output shaft by a connecting sleeve, the connecting sleeve suitably fastened to the first powered wheel axle end and the power output shaft.

11. An axle assembly for a transport system for a portable auger the axle assembly comprising:

an axle housing, having a first axle housing end and a second axle housing end; a transport powered drive unit having a power output shaft, the transport powered drive unit mounted internal to the axle housing;

a powered wheel axle having a first powered wheel axle end and a second powered wheel axle end, the first powered wheel axle end suitably connected to the power output shaft, the second powered wheel axle end protruding from the first axle housing end;

a drive hub inserted on the second powered wheel axle end, the drive hub suitably attached to the second powered wheel axle end to freewheel about the powered wheel axle, the drive hub having a means for attachment of a first wheel;

a means for selectively locking the drive hub to the powered wheel axle to prevent the drive hub from freewheeling about the powered wheel axle;

a freewheeling axle having a first freewheeling axle end and a second freewheeling axle end, the first freewheeling axle end suitably connected to the second axle housing end, the second freewheeling housing end having means for attachment of a second wheel, and a lock for locking the power output shaft comprises an opening in the powered output shaft; an opening in the axle housing and a drive axle pin, whereby insertion of the drive axle pin in the openings in the axle housing and the power output shaft locks the power output shaft.

12. The axle assembly of claim 11 wherein the means for selectively locking the drive hub to the powered wheel axle comprises an opening in the powered wheel axle; and opening in the drive hub; and a hub locking pin, whereby insertion of the hub locking pin in the openings in the powered wheel axle and the drive hub locks the drive hub to the powered wheel axle.

13. The axle assembly of claim 11 wherein the first powered wheel axle end is suitably connected to power output shaft by a connecting sleeve, the connecting sleeve suitably fastened to the first powered wheel axle end and the power output shaft.

* * * * *